UNITED STATES PATENT OFFICE.

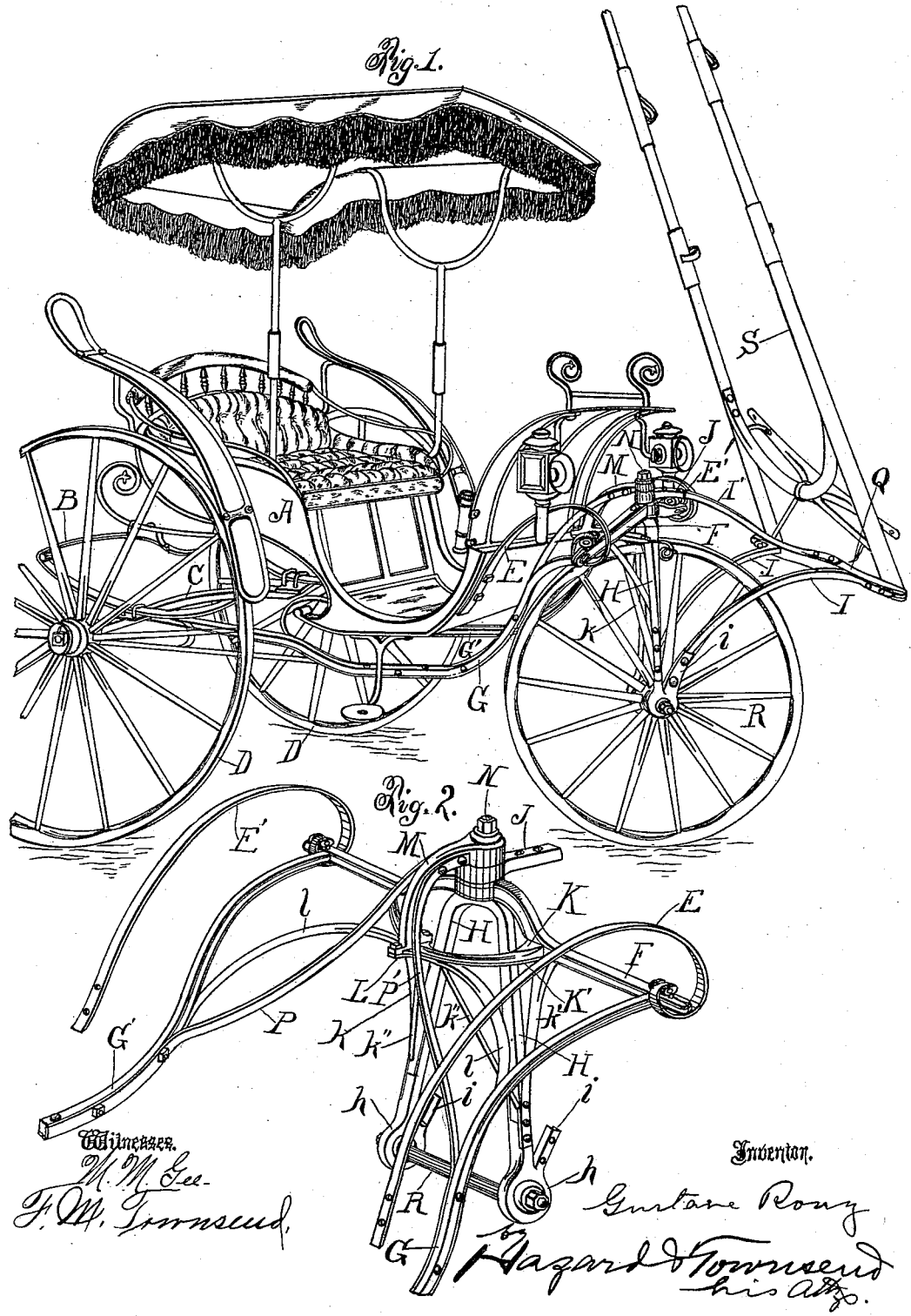

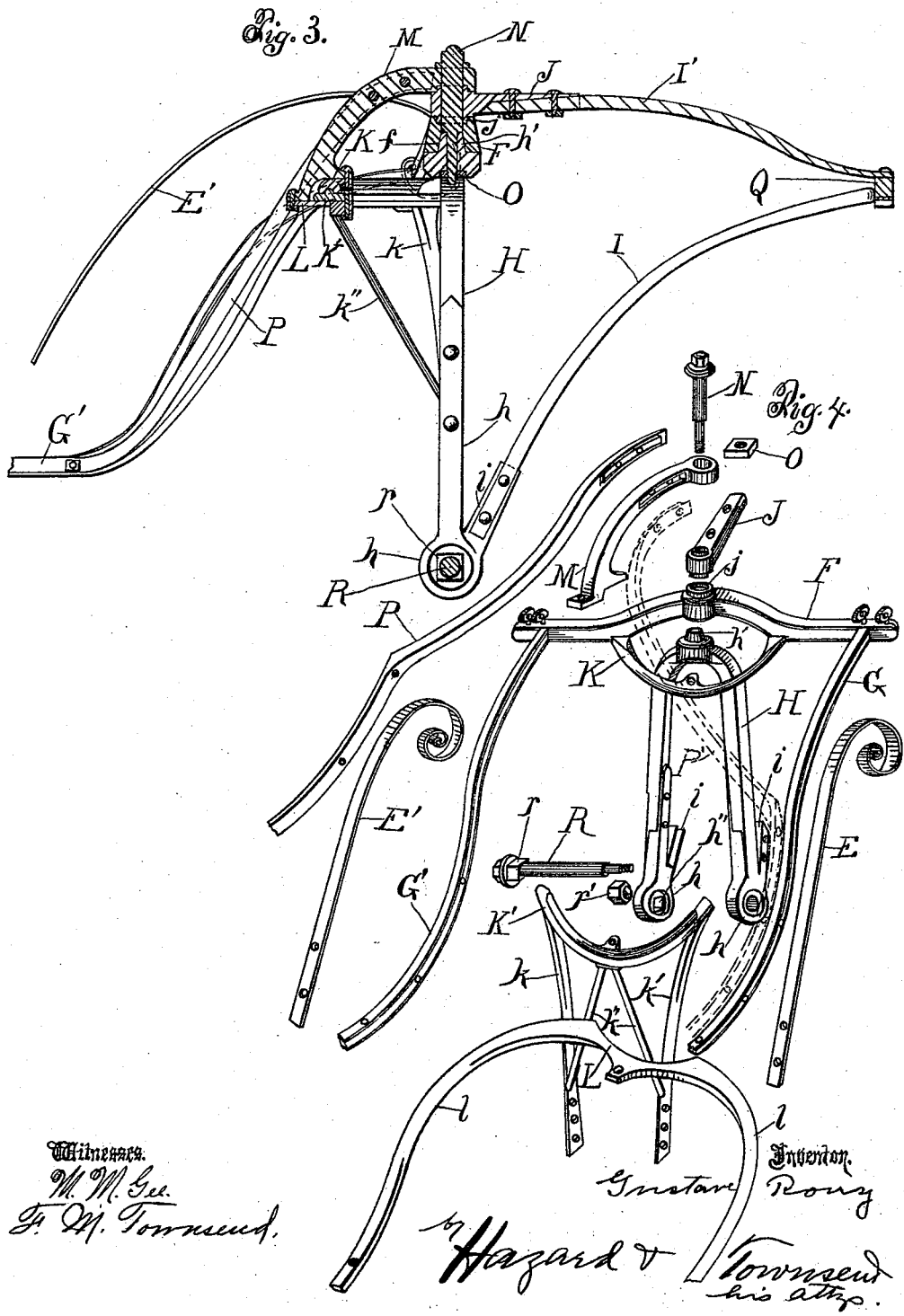

GUSTAVE ROUY, OF REDLANDS, CALIFORNIA.

THREE-WHEELED CARRIAGE.

SPECIFICATION forming part of Letters Patent No. 490,400, dated January 24, 1893.

Application filed September 16, 1892. Serial No. 446,058. (No model.)

*To all whom it may concern:*

Be it known that I, GUSTAVE ROUY, a citizen of the United States, residing at Redlands, in the county of San Bernardino and State of California, have invented a new and useful Improvement in Three-Wheeled Carriages, of which the following is a specification.

My invention relates to the class of three wheeled vehicles adapted to be drawn by animals or other motive power applied from in front of the vehicle.

The object of my invention is to construct a carriage of this class, which, while being more convenient of access and easier to turn in narrow compass than four wheeled vehicles, will be of such strength and will present such an elegance of appearance that it will meet with public favor.

My invention pertains specifically to the construction and combination of parts whereby I accomplish this object.

The accompanying drawings illustrate my invention.

Figure 1 represents a three wheeled phaeton embodying my invention. Fig. 2 is a perspective detail of the swivel attachment for connecting the front wheel with the body of the vehicle. Parts are removed to contract the view. Fig. 3 is a vertical mid-section from front to rear of the swivel attachment including the parts not shown in Fig. 2. Fig. 4 is a detail view showing various parts in perspective separated from each other but disposed as near as possible, consistent with clearness, in the relative positions they occupy when the vehicle is put together. Some of the parts are broken to contract the view and a fragment of one of the reach hounds is indicated solely in dotted lines.

For the purpose of securing suitable rigidity and strength while yet providing a desirable elasticity and lightness, some of the parts are constructed of a central rib or filling of suitable hard-wood with outer metal straps.

The rear of the body A of the vehicle is supported in the ordinary manner by springs B resting upon the axle C which is supported by the rear wheels D, and the front of the body of the vehicle is supported by the front supporting springs E E' which are bolted or otherwise secured to the body A and arranged to project forward and rest upon the reach bar F which connects and supports the two reaches G G' and is pivoted upon the axle swivel or straddle brace H which is provided at the lower ends of its arms with the axle boxes $h\ h$ and with the hound securing sockets $i\ i$ by which the lower draft hounds I I are respectively secured to the axle boxes. The axle swivel is provided at the top with a hollow tapering pivot $h'$ adapted to fit in a socket $f$ in the reach bar F which reach bar is provided on the top with a socket $j$ for the upper hound socket J to which the upper hound I' is secured.

K is the upper member of the fifth wheel secured to and projecting back from the reach bar F, and K' is the lower member of the fifth wheel secured to the axle swivel H by the standards $k\ k'$ provided with stays $k''$ which support the middle or rear bend of such lower member.

L indicates the fifth wheel supporting plate provided with lateral stay arms $l\ l$ which are attached respectively to the reaches G G'.

M is the king bolt and fifth wheel brace secured to the upper member K of the fifth wheel and to the fifth wheel supporting plate L and arranged to rest upon the upper front hound socket J and is provided with a king bolt hole to receive the king bolt N the main body of which is equal in diameter to the top of the pivot $h'$ and is reduced in its lower portion to extend through the king bolt hole which extends downward through the pivot and the axle swivel H to which it is secured by a nut O which is countersunk into the swivel H or otherwise secured thereto so that the king bolt which is screw threaded may be secured in place by being inserted through the eyes or king bolt holes of the fifth wheel brace, hound socket, cross bar, and axle swivel and then turned to screw into the nut.

P, P' are the reach and fifth wheel brace hounds which are fixed respectively to the reaches G G' by one end and to the upper portion of the reach brace M by the other end extending obliquely outward and backward from the brace M to the reaches. The reaches are thus rigidly connected with the spring supporting cross bar F, and the fifth wheel brace M.

The shafts S (or tongue) by which the vehicle is to be drawn is secured to the reaches, the front wheel and the body supporting springs through the medium of the draft bar Q to which the shafts are secured, the upper draft hound I' arranged to extend from the middle of the draft bar to the reach bar F to which it is secured by the king bolt N, and the lower draft hounds I I secured respectively by one end to the draft bar near its ends and secured by the other end to the lower end of the swivel brace H.

R is the axle by which the wheel is secured to the swivel brace.

$r$ is an angular boss upon such axle to fit into an angular socket $h''$ in one of the axle boxes to prevent the axle from turning in the swivel brace. The axle is secured in place by the nut $r'$.

When the parts are secured together in position as shown in Fig. 1, perfect rigidity is secured with elegance of appearance, ease of support and security against accident.

Now having described my invention what I claim as new and desire to secure by Letters Patent is;—

1. A three wheeled vehicle comprising the combination of the axle swivel H provided at the lower ends of its arms with the axle boxes and with the hound securing sockets; the reach bar F pivoted upon the axle swivel; the reaches G G' secured to the ends of the reach bar; the front supporting springs arranged to rest upon the reach bar and secured thereto; the upper member of the fifth wheel secured to and projecting back from the reach bar; the lower member of the fifth wheel secured to the axle swivel; the fifth wheel supporting plate provided with lateral stay arms attached respectively to the reaches; the king bolt and fifth wheel brace secured to the upper member of the fifth wheel and to the fifth wheel supporting plate and arranged to rest upon the upper front hound socket and provided with the king bolt hole; the upper front hound having its socket pivoted upon the reach bar and provided with the king bolt hole; the lower front hounds connected with the boxes of the axle swivel; the draft bar secured to the front hounds and the king bolt arranged to pivotally secure the upper front hound and the axle swivel to the reach bar and fifth wheel brace.

2. A three wheeled vehicle comprising the combination of the axle swivel provided with the axle boxes; the reach bar pivoted upon such swivel and connected with the body of the vehicle; the draft bar; the lower draft hounds I, I secured respectively at their lower ends to the lower ends of the axle swivel and secured at their upper ends to the draft bar; the upper draft hound I' secured at its front end to the draft bar and pivoted to the reach bar, and the king bolt arranged to secure the upper hound, reach bar and axle swivel together.

GUSTAVE ROUY.

Witnesses:
JAMES R. TOWNSEND,
JOHN MCINTOSH,
L. W. CLARK.